United States Patent
Galbraith et al.

(10) Patent No.: US 11,301,787 B1
(45) Date of Patent: Apr. 12, 2022

(54) COMPUTER MEDIATED TRANSACTION COMMIT SYSTEM

(71) Applicant: Fanimal, Inc., Santa Monica, CA (US)

(72) Inventors: David Galbraith, Santa Monica, CA (US); Jonathan Halprin, Los Angeles, CA (US); Sam McClure, Venice, CA (US)

(73) Assignee: FANIMAL, INC., Santa Monica, CA (US)

( * ) Notice: Subject to any disclaimer, the term of this patent is extended or adjusted under 35 U.S.C. 154(b) by 0 days.

(21) Appl. No.: 17/198,933

(22) Filed: Mar. 11, 2021

Related U.S. Application Data

(60) Provisional application No. 63/063,676, filed on Aug. 10, 2020.

(51) Int. Cl.
| | |
|---|---|
| *G06Q 20/04* | (2012.01) |
| *G06Q 10/08* | (2012.01) |
| *G06F 16/23* | (2019.01) |
| *G06F 9/54* | (2006.01) |
| *G06Q 20/38* | (2012.01) |
| *G06Q 20/22* | (2012.01) |
| *G06Q 10/02* | (2012.01) |

(Continued)

(52) U.S. Cl.
CPC .......... *G06Q 10/02* (2013.01); *G06F 9/547* (2013.01); *G06F 16/2343* (2019.01); *G06F 16/2379* (2019.01); *G06F 16/953* (2019.01); *G06Q 10/087* (2013.01); *G06Q 20/0457* (2013.01); *G06Q 20/40* (2013.01); *G06Q 20/29* (2013.01); *G06Q 20/389* (2013.01)

(58) Field of Classification Search
CPC .. G06Q 10/02; G06Q 10/087; G06Q 20/0457; G06Q 20/29; G06Q 20/389; G06Q 20/40; G06F 16/237; G06F 16/953; G06F 16/2343; G06F 9/547; G06F 16/2379
See application file for complete search history.

(56) References Cited

U.S. PATENT DOCUMENTS

| | | | | |
|---|---|---|---|---|
| 8,606,644 | B1 * | 12/2013 | Bruckhaus | G06Q 10/02 705/26.1 |
| 2007/0066397 | A1 * | 3/2007 | Nammi | G06Q 10/02 463/42 |
| 2017/0337521 | A1 * | 11/2017 | Godbole | G06Q 10/1095 |

(Continued)

FOREIGN PATENT DOCUMENTS

CN 105528642 A * 4/2016

OTHER PUBLICATIONS

"Group Ticketing Platform Makes It Easy to Sit with Friends," by Brad Muller, Aug. 9, 2018 (Year: 2018).*

(Continued)

*Primary Examiner* — George Chen
*Assistant Examiner* — Brian Adams Heflin
(74) *Attorney, Agent, or Firm* — Baker Botts L.L.P.

(57) ABSTRACT

Commit locks are used to control group transactions in tickets according to an algorithm by which a group transaction is initiated by a host computer and identifies a specified minimum number of tickets, but the group transaction cannot execute unless the host computer and/or one or more guest computers request greater than or equal to the specified minimum number of tickets. The text of the broadest independent claim also may serve as an abstract of the disclosure.

10 Claims, 14 Drawing Sheets

(51) Int. Cl.
*G06Q 20/40* (2012.01)
*G06F 16/953* (2019.01)

(56) References Cited

U.S. PATENT DOCUMENTS

| | | |
|---|---|---|
| 2019/0012612 A1* | 1/2019 | Skeen .................. G06Q 20/102 |
| 2019/0095825 A1* | 3/2019 | Joachim ................ G06Q 10/02 |
| 2020/0050976 A1* | 2/2020 | Lowe .................... G06Q 20/102 |
| 2020/0111112 A1* | 4/2020 | Warner ............... G06Q 30/0206 |

OTHER PUBLICATIONS

"Fevo CEO: Why Split The Ticket Needed A Makeover," by PYMNTS, Nov. 29, 2017 (Year: 2017).*

* cited by examiner

‹ Back        ⊘ Fanimal

Create Group

1. Create Group
2. Sign Up / Log In
3. Payment & Delivery
4. Invite Friends

Odesza
Bill Graham Civic Auditorium, San Francisco
Friday, Dec 12 · 8pm

216 — Name: Odesza Group ✎

218 — Description: ✎
This description can be up to 250 characters

Minimum group size

220 — ① ② ③ ④

The group must reach this size within 24 hours otherwise it will expire (and nobody will be charged or receive tickets).

222 — How many tickets do you want now?

① ② ③ ④

The group will be created immediately, you will be charged, and you will be able to invite more friends from the group page.

224 — [ Continue ]

---

Summary:

Odesza
Bill Graham Civic Auditorium,   x 1
San Francisco
Friday, Dec 12 · 8pm

| | |
|---|---|
| Ticket price (gen adm) | $40 |
| Shipping | $15 |
| Never any fees | $0 |
| Group discount | -$2 |
| Credit applied | -$20 |
| TOTAL AUTHORIZED | $33 |

Earn Bonus Credit!

As your group grows, we'll add credit to your account. Up to $20 available!

- Group of 2 or more (done!)    +$5
- Group of 4 or more (need 1 more)    +$5
- Group of 10 or more (need 7 more) +$10

*FIG. 2B*

‹ Back           ⊙ Fanimal

Group: Payment & Delivery   All tickets are backed by our Ticket Guarantee.
1. Create Group
2. Sign Up / Log In
3. Payment & Delivery
4. Invite Friends

Payment (secured & encrypted via SSL/TLS)

- ● Credit or Debit Card     ☐☐☐☐
  - ○ Visa ending in 1111
  - ○ MasterCard ending in 1111
  - ● Add new card...
  - Card number
  - [ 4444 4444 4444 4444 ]
  - Expiration   CVC   Zip
  - [02/22/2222] [111] [94123]
- ○ PayPal                       ₱PayPal
- ○ Affirm (monthly payments)      affirm)

226

Credit: up to $1 available

[              ] [Redeem]

$20 applied!   Remove

Delivery
FedEx does not ship to P.O. boxes and only delivers on business days (signature not required).

228

- ● 2390 Chestnut Street #304, San Francisco, CA 94123
- ○ Add new shipping address I agree to Fanimal's Terms of User and Ticket Sale Policy and acknowledge that:
-All sales are final (double check the event date and location)
-Tickets are owned by sellers who set prices that may be above or below face value
⊂●

230

[ Authorize & Create Group ]

Summary:

Odesza
Bill Graham Civic Auditorium,   x 1
San Francisco
Friday, Dec 12 · 8pm

| | |
|---|---|
| Ticket price (gen adm) | $40 |
| Shipping | $15 |
| Never any fees | $0 |
| Group discount | -$2 |
| Credit | -$20 |
| TOTAL CHARGED | $53 |
| Bonus account credit (group of 2) | $10 |

*FIG. 2C*

| ‹ Back | ⊙ Fanimal |
|---|---|

Group: Payment & Delivery   All tickets are backed by
1. Create Group                  our Ticket Guarantee.
2. Sign Up / Log In
3. Payment & Delivery
4. Invite Friends

Payment (secured & encrypted via SSL/TLS)

- ● Credit or Debit Card   ▢▢▢▢
  - ○ Visa ending in 1111
  - ○ MasterCard ending in 1111
  - ● Add new card...
    Card number
    [ 4444 4444 4444 4444 ]
    Expiration    CVC    Zip
    [02/22/2222] [111] [94123]
- ○ PayPal                 ₽PayPal
- ○ Affirm (monthly payments)    affirm)

Summary:

Odesza
Bill Graham Civic Auditorium,  x 1
San Francisco
Friday, Dec 12 · 8pm

| Ticket price (gen adm) | $40 |
| Shipping | $15 |
| Never any fees | $0 |
| Group discount | -$2 |
| Credit | -$20 |
| TOTAL CHARGED | $53 |
| Bonus account credit (group of 2) | $10 |

Credit: up to $1 available
[          ] [Redeem]
$20 applied!   Remove

Delivery
FedEx does not ship to P.O. boxes and only delivers on business days (signature not required).
- ● 2390 Chestnut Street #304, San Francisco, CA 94123
- ○ Add new shipping address

I agree to Fanimal's Terms of User and Ticket Sale Policy and acknowledge that:
-All sales are final (double check the event date and location)
-Tickets are owned by sellers who set prices that may be above or below face value
⊙●

232 —
[ Purchase & Create Group ]

🔍 Search...      ⊙ Fanimal      About   Jobs   &SM

Home > Events + Groups > Bob Moses Group

PUFF LAH

Bob Moses Group
Bob Moses
Friday, Dec 12 · 8pm
Bill Graham Civic Auditorium, San Francisco Hey everyone! Stoked to hang with you all on my birthday. It's going to be the best day ever, I'm so excited I can hardly contain myself.

About
Lorum ipsum Lorum ipsum Lorum ipsum Lorum ipsum Lorum ipsum Lorum ipsum...

( More )

RSVPs (2)

(SM) Sam McClure (host)

(+1) Sam McClure's +1

(JJ) Jimbob Jimson

Can't make it (1)

(JJ) Joe-bob Johnson ("staying in with the old ball and chain!")

316 — Starting at $1/month with affirm
[ Join Group (from $50) ]

Minimum group size: 3    1 more needed (23h, 58m, 22s)
The group size must reach minimum size before time runs out otherwise the group will expire. Nobody is charged or receives tickets until the group reaches its minimum size.

Invite guests from previous group

Savings: $12
$2 upfront discount +$10 in credit for a group of 2.
+$X in credit when your group 4.
+$10 in credit when your group reaches 10.

*FIG. 3C*

| Search... | ⊙ Fanimal | | About | Jobs | &SM |

Home > Events + Groups > Bob Moses Group

Bob Moses Group
Bob Moses
Friday, Dec 12 · 8pm
Bill Graham Civic Auditorium, San Francisco Hey everyone! Stoked to hang with you all on my birthday. It's going to be the best day ever, I'm so excited I can hardly contain myself.

RSVPs (2)

(SM) Sam McClure (host)

(+1) Sam McClure's +1

Can't make it (1)

(JJ) Joe-bob Johnson ("staying in with the old ball and chain!")

318 —
[ Invite ]

Minimum group size: 3  1 more needed (23h, 58m, 22s)
The group size must reach minimum size before time runs out otherwise the group will expire. Nobody is charged or receives tickets until the group reaches its minimum size.

Invite guests from previous group

Savings: $12
$2 upfront discount +$10 in credit for a group of 2.
+$X in credit when your group 4.
+$10 in credit when your group reaches 10.

Buy more tickets
If you want to pay for a +1, you can buy another ticket the old-fashioned way.

320 —
[ Buy More Tickets (from $50) ]

About
Lorum ipsum Lorum ipsum Lorum ipsum Lorum ipsum Lorum ipsum Lorum ipsum...

( More )

*FIG. 3D*

Home > Events + Groups > Bob Moses Group

Bob Moses Group
Bob Moses
Friday, Dec 12 · 8pm
Bill Graham Civic Auditorium, San Francisco Hey everyone! Stoked to hang with you all on my birthday. It's going to be the best day ever, I'm so excited I can hardly contain myself.

RSVPs (2)

(SM) Sam McClure (host)

(+1) Sam McClure's +1

(JJ) Jimbob Jimson

Can't make it (1)

(JJ) Joe-bob Johnson ("staying in with the old ball and chain!")

About
Lorum ipsum Lorum ipsum Lorum ipsum Lorum ipsum Lorum ipsum Lorum ipsum...

( More )

[ Invite ]

Savings: $12
$2 upfront discount +$10 in credit for a group of 2.
+$X in credit when your group 4.
+$10 in credit when your group reaches 10.

Buy more tickets
If you want to pay for a +1, you can buy another ticket the old-fashioned way.

[ Buy More Tickets (from $50) ]

COMPUTER MEDIATED TRANSACTION COMMIT SYSTEM

BENEFIT CLAIM

This application claims the benefit under 35 U.S.C. § 119 of provisional application 63/063,676, filed Aug. 10, 2020, the entire contents of which are hereby incorporated by reference for all purposes as if fully set forth herein.

TECHNICAL FIELD

One technical field of the present disclosure is computer-implemented techniques for controlling the commitment of transactions in which multiple distributed computers are involved to allow commitment of a transaction only under specified circumstances. Another technical field is distributed database systems.

BACKGROUND

The approaches described in this section could be pursued but are not necessarily approaches that have been previously conceived or pursued. Therefore, unless otherwise indicated herein, the approaches described in this section are not prior art to the claims in this application and are not admitted to be prior art by inclusion in this section.

Distributed computer systems are widely used for processing large numbers of transactions at high speed. Client-server computer systems are one category of such systems. Server computers, interconnected to thousands or millions of client computers such as personal computers or mobile computing devices, have become ubiquitous in processing a variety of transactions. In some areas of commerce, such as online auctions, online ticketing, or gaming, computer-implemented controls are required to enforce rules on which computer, among thousands or millions of client computers, is permitted to complete a transaction, when, and how.

Certain events require tickets for entry, such as sports events, concerts, theatre, conventions, and other forms of assembly. The tickets are listed for sale on online ticket marketplaces, exchanges, or websites by the venue or by other sellers. Customers purchase such tickets using customer computers that connect to online transaction processing systems. For customers attending an event in a group, one method of acquiring tickets is that a single purchaser purchases tickets for multiple people. However, customers may find it difficult or impossible to coordinate their group effectively and purchase the correct number of tickets. If they purchase too few tickets, then some interested parties may be unable to attend. If they purchase too many tickets, then some tickets may not be used. In addition, communication, coordination, and reimbursement pose significant challenges to the customer.

When each prospective group member has a different client computing device, large numbers of text messages, e-mail messages, or voice calls may be required to inform the prospective group members about an event, where to find tickets, which tickets to purchase and how to purchase them. These messages and calls, in the aggregate, can consume immense amounts of CPU cycles, network bandwidth, and digital data storage resources.

Furthermore, sellers usually offer tickets in even-numbered sets, such as two, four, or six tickets. If the prospective group has an odd number of members, the group may have to form subgroups, each of which acquires one of the available sets of tickets. The formation of subgroups can lead to undesirable failure scenarios such as a party of thirteen having eight seats in one row and five seats in a different row.

Therefore, there is a need for improved techniques to reduce the consumption of these resources while concurrently providing a better and more reliable way for multiple client computers in a group to pay for tickets for group attendance at an event.

SUMMARY OF THE INVENTION

The appended claims may serve as a summary of the invention.

BRIEF DESCRIPTION OF THE DRAWINGS

In the drawings:

FIG. 2B illustrates an example wireframe of a Create a Group Page.

FIG. 2C illustrates an example wireframe of a Payment and Delivery—Authorize and Create Group Page.

FIG. 2D illustrates an example wireframe of a Payment and Delivery—Purchase and Create Group Page.

FIG. 3B illustrates an example wireframe of a Host Group Page—Minimum Size Reached.

FIG. 3C illustrates an example wireframe of a Guest Group Page—Not Joined—Minimum Size Not Reached.

FIG. 3D illustrates an example wireframe of a Guest Group Page—Joined—Minimum Size Not Reached.

FIG. 3E illustrates an example wireframe of a Guest Group Page—Joined—Minimum Size Reached.

DETAILED DESCRIPTION

Figure 1:
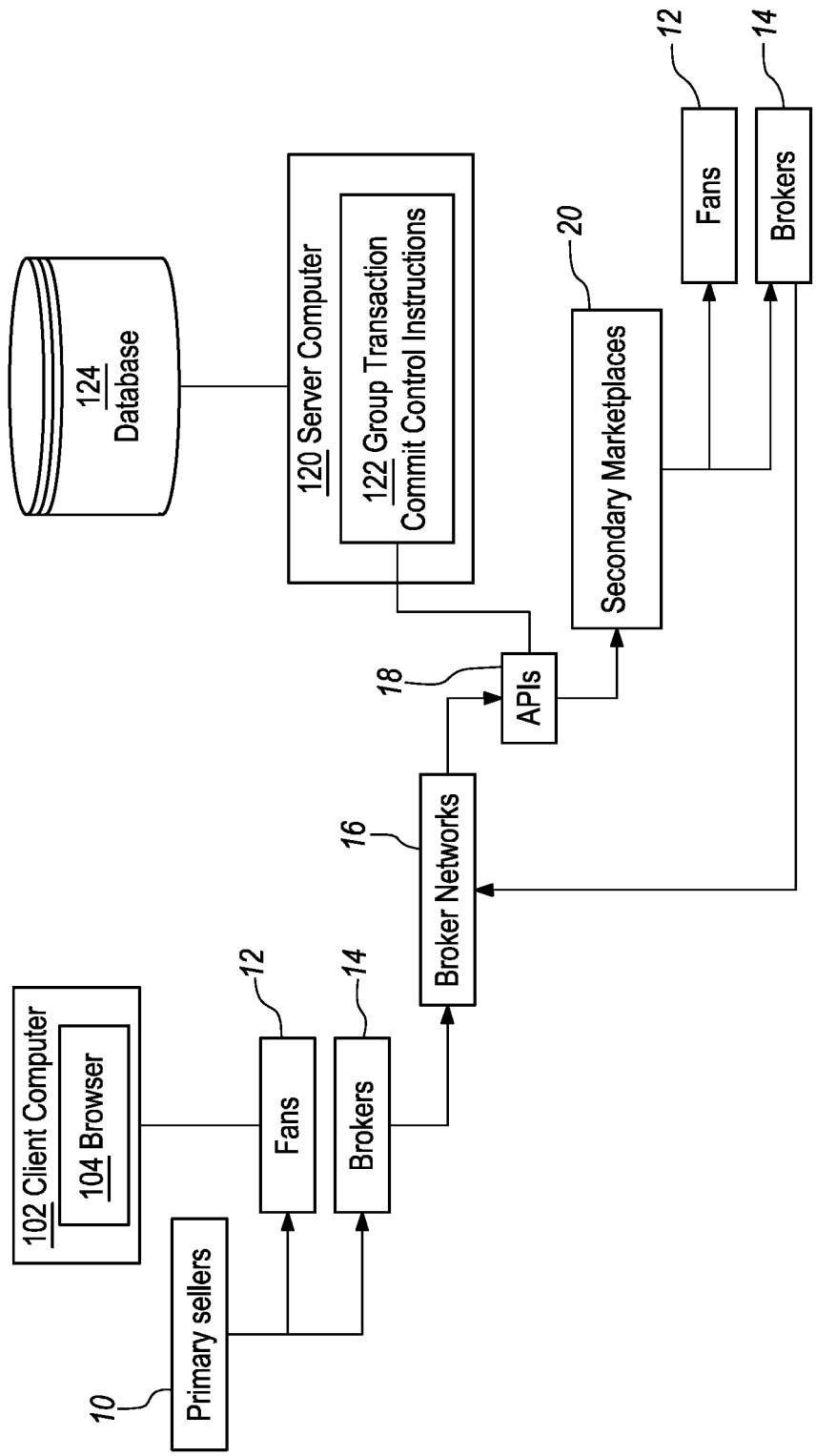
FIG. 1 illustrates an example network of distributed computers that can form one environment or context for an embodiment.

Commit locks are used to control group transactions in items according to an algorithm by which a group transaction is initiated by a host computer and identifies a specified minimum number of items, but the group transaction cannot execute unless the host computer and/or one or more guest computers request greater than or equal to the specified minimum number of items. Payment processing, such as charges to payment cards of the host computer and the guest computer(s), are not requested unless the host computer and/or one or more guest computers request greater than or equal to the specified minimum number of items. Items, in one embodiment, are event tickets that are associated with one or more dynamic supplies or dynamic supply catalogues. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1. General Overview
2. Structural and Functional Overview
   2.1 Tickets Managed by Secondary Markets; Group Transactions Managed by Service Provider
   2.2 Tickets and Group Transactions Both Managed by Service Provider
   2.3 Tickets Managed by Secondary Markets; Group Transactions Managed by Independent Party under License from Service Provider
   2.4 Tickets Managed by Independent Party and Group Transactions Managed by Same Independent Party under License from Service Provider
3. Table of Functional Scenarios
4. Benefits of Certain Embodiments
5. Implementation Example—Hardware Overview
6. Extensions and Alternatives

1. General Overview

In an embodiment, the disclosure describes a computer system, computer-implemented method, and mobile device application for improving the efficiency and experience of purchasing tickets in a group. In an embodiment, the disclosure provides computer-implemented processes to control the initiation of a group ticket transaction, the addition of client computers to a group, requests and responses to payment or charge authorization operations, and the commitment of purchase transactions in a defined manner. In one embodiment, the disclosure provides systems and methods that allow multiple individuals to purchase tickets in a group such that the members pay individually, receive tickets individually, and where no payment is processed or no party receives tickets if the minimum group size is not met before the group expires.

In one embodiment, the disclosure provides controls for committing transactions concerning group acquisition of general admission tickets to live events. Other embodiments may provide controls for committing transactions concerning group acquisition of seated events and/or virtual events.

In one embodiment, the disclosure provides a computer-implemented method of controlling commitment of transactions in items, the method comprising receiving, from a host computer, a request to create a group transaction record, the request specifying a specified minimum number of units of the items, and storing the specified minimum number in the group transaction record; setting a commit lock in the group transaction record; receiving, from the host computer, a request to acquire a host number of units of the items; determining whether the host number of units is greater than or equal to the specified minimum number of units, and in response, when the host number of units is greater than or equal to the specified minimum number of units, clearing the commit lock and executing a first transaction of the host computer to acquire the host number of units of the items, and otherwise: entering a wait state; receiving, from a first guest computer, a request to acquire one or more first guest units of the items; determining whether a sum of the host number of units and the first guest units is greater than or equal to the specified minimum number of units, and in response, when the sum is greater than or equal to the specified minimum number of units, clearing the commit lock and executing a second transaction of the host computer to acquire the host number of units of the items and executing a third transaction of the first guest computer to acquire the one or more first guest units of the items, and otherwise: maintaining the commit lock and returning to the wait state. "Units of items," in this context, may be tickets obtained from a dynamic supply of tickets.

2. Structural and Functional Overview

Figure 4:
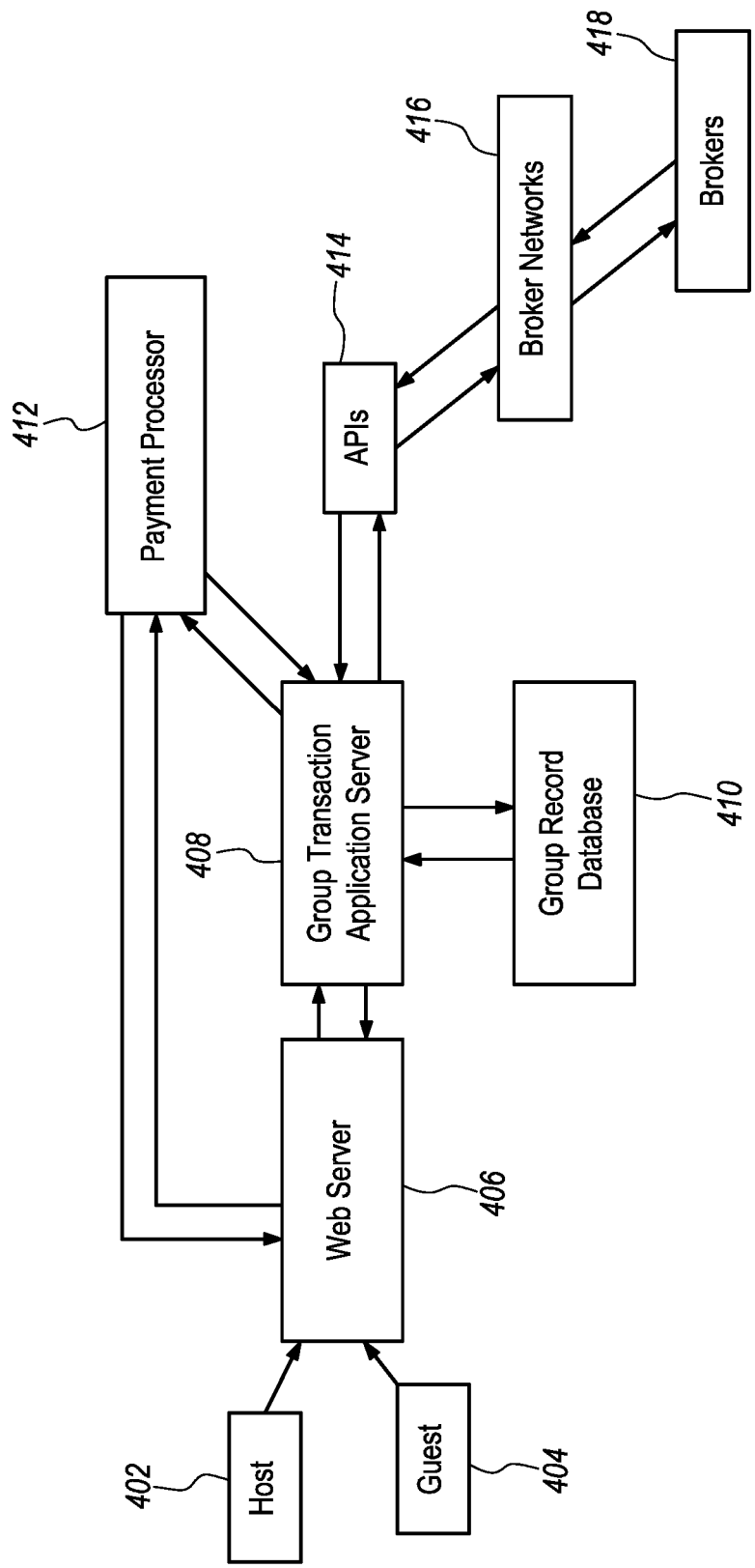
FIG. 4 illustrates an example of the process for receiving & authorizing payments and securing tickets from suppliers.
Figure 6:
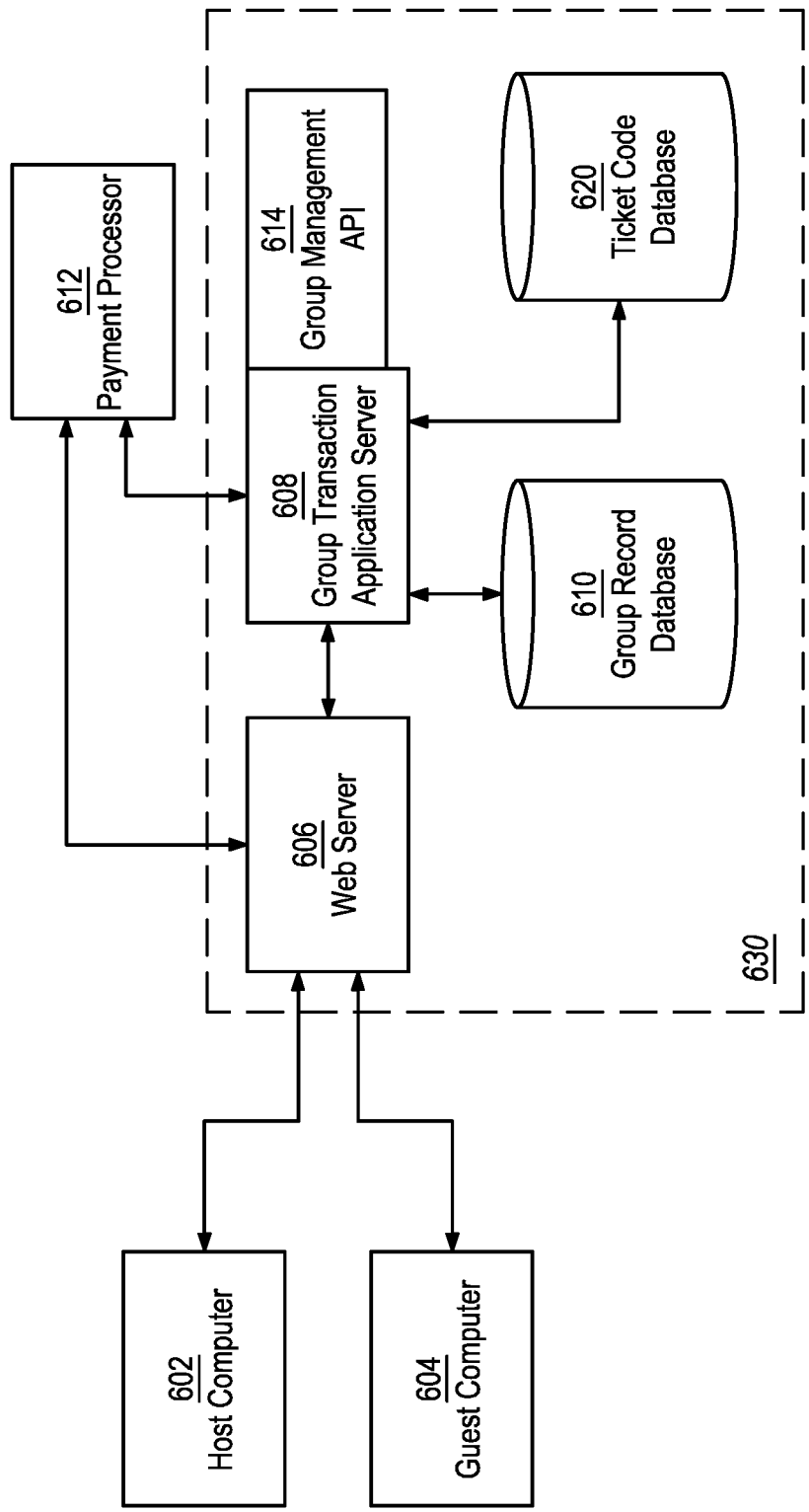
FIG. 6 illustrates an embodiment in which the same set of distributed computing elements store, host, and manage both ticket codes and group transactions.

2.1 Tickets Managed by Secondary Markets; Group Transactions Managed by Independent Service Provider FIG. 1 illustrates an example network of distributed computers that can form one environment or context for an embodiment. In an embodiment, FIG. 1 also illustrates an example of the flow of tickets through primary markets and secondary markets. For purposes of the appended claims, each element of FIG. 1 having a reference numeral represents a computer associated with an entity, rather than the entity itself. For example, primary seller 10 is a computer associated with a primary seller entity, not the entity itself. Thus, all elements of FIG. 1 as well as FIG. 4, FIG. 6 are technical elements, and none represents a person or entity. Each computer may be any of a server computer, a virtual computing instance hosted in a public or private data center or cloud computing service, a mobile computing device, personal computer or other computer as appropriate to the associated entity and functional purpose.

In an embodiment, primary sellers 10 list tickets for sale on primary ticketing platforms. Examples of primary ticketing platforms include Ticketmaster and Eventbrite, and the server computers associated with delivering these SaaS services or Web services over internetworks to browsers of client computers. Tickets are purchased in the first instance by fans 12 or professional resellers or "Brokers" 14. The Brokers 14 list tickets for sale via point-of-sale systems provided by supply aggregators or "Broker Networks" 16. The Broker Networks 16 organize listings into a supply feed and make the feed available via a computer-implemented application programming interface (API) 18 that other computers in FIG. 1 can call to request or commit transactions.

In an embodiment, secondary marketplaces 20 integrate with APIs 18 to make the supply feeds available on their websites. Fans 12 then purchase tickets on the secondary marketplaces 20. Sometimes Brokers 14 purchase tickets on the secondary marketplaces 20 and re-list those tickets via Broker Networks 16.

In an embodiment, one or more of the secondary marketplaces 20 comprises server computers that are programmed to execute a ticket purchase process utilizing API 18 using the following example generalized algorithm:

2.1. Fan 12 is associated with a client computer 102 that executes a browser 104, such as FIREFOX, CHROME, EDGE, or SAFARI, among others. Fan 12 uses browser 104 to navigate to an event page that is transmitted from a server computer 120 that is associated with a secondary marketplace 20. The server computer 120 comprises a database 124 that stores records of ticket groups that have been retrieved via calls to API 18. The server computer 120 dynamically generates web pages that display ticket listings based on transmitting queries to the database 124 and retrieving result sets, then returning the web pages in HTTP responses to the browser 104.

2.2. Using browser 104 and an input device coupled to client computer 102, fan 12 selects a ticket group and proceeds to a checkout page that is received from the server computer 120.

2.3. In an embodiment, the server computer 120 locks the tickets using a call to the API 18 for an agreed period, such as ten minutes. No other secondary marketplaces 20 or other webpages integrated with the API 18 may sell those tickets during the period of the lock. Locking may comprise setting a flag value, lock value, or other column attribute in a table of a relational database that stores ticket data and using programmed logic to inspect the value and decline offering the tickets to other buyer computers when the lock value is set.

2.4. Fan 12 enters information including payment card details in the checkout page or uses secure credentials to retrieve stored payment card information and confirms the purchase.

2.5. In an embodiment, the secondary marketplace 20 processes a customer payment. In some embodiments, a card charge is performed. In other embodiments, other payment methods may be used such as PayPal, Affirm, Venmo, and so forth, and the specific payment mechanism is not critical. Throughout this disclosure the terms "charge" or "card charge" are used to refer to one method of payment processing, but all such usage is intended to refer broadly to payment processing of other kinds. Processing payment methods may use API calls to card processors or payment networks.

2.6. The secondary marketplace 20 finalizes the order using a call to the API 18.

2.7. A server computer associated with an operator of the API 18 transmits a notification message, via Broker Networks 16, to the Broker 14 who listed the tickets in the secondary marketplaces 20.

2.8. The Broker 14 sends the ticket(s) to the fan 12, using electronic transmission or other means of conveyance.

In an embodiment, server computer 120 comprises group transaction commit control instructions 122, which are programmed to control the initiation of a group ticket transaction, the addition of client computers to a logical group, requests and responses to payment or charge authorization operations, and the commitment of purchase transactions in the manner described in the following sections. In one embodiment, group transaction commit control instructions 122 are programmed to allow multiple accounts or computers to request purchase tickets in a group such that the members pay individually, receive tickets individually, but where no account or computer is charged or subject to payment processing, or receives tickets, if the minimum group size is not met before the group expires. In this manner, the techniques herein are programmed to create a transaction and manage addition of elements to the transaction while blocking the transaction from committing except under specified conditions that are defined in advance.

In various embodiments, server computer 120 may be implemented using any of a server computer hosted on premises of an enterprise serving as a secondary marketplace, in one or more cloud computing instances in a private data center or public cloud computing facility, using a cluster of computers, minicomputers or mainframes.

Server computer 120 is coupled via network links using one or more of a LAN, WAN, and/or internetworks to the provider of API 18 and is programmed to call the APIs using programmatic calls. The specific type and structure of the network links is not critical provided that instructions 122 can issue programmatic calls to the APIs 18 and receive response messages via electronic transmission for interpretation, action and execution.

In an embodiment, fans 12 and/or Brokers 14 use client computers 102 with browsers 104 to establish HTTP connections to a web server hosted by server computer 120, which generates webpages using dynamic HTML to present information to the browsers and conduct interactive transactions with the fans and/or Brokers and their client computers.

In an embodiment, fan 12 uses client computer 102 with browser 104 to contact server computer 120 of secondary marketplace 20 and receive a dynamically generated HTML webpage comprising an event page in an HTTP response from the server computer to the browser.

Figure 2A:
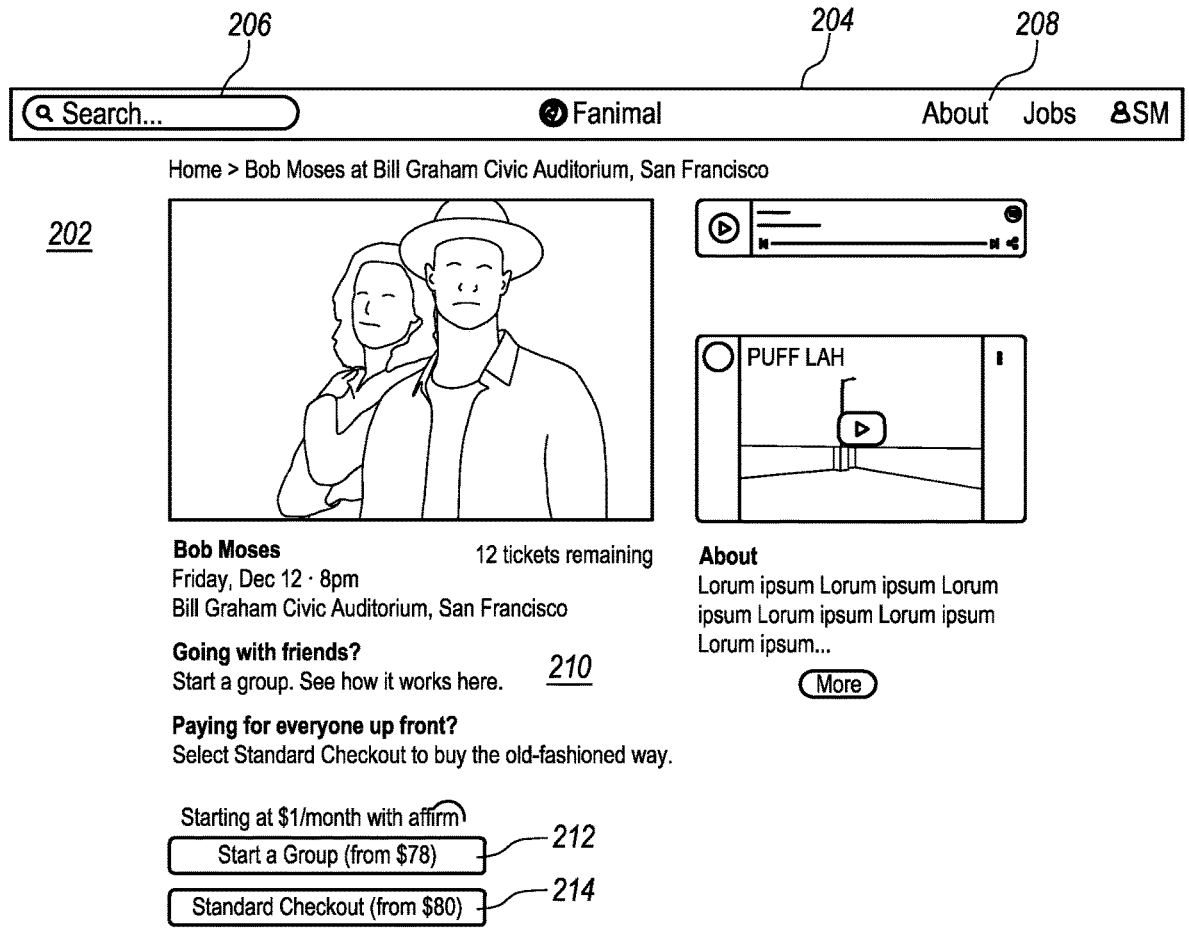
FIG. 2A illustrates an example wireframe of an Event Page.

FIG. 2A illustrates an example wireframe of an Event Page. FIG. 2A, and each other drawing figure that is termed a wireframe, represents a display device of a client computing device and output data that the secondary marketplace 20, or another computer as indicated by the context, generates under stored program control and provides to the client computing device for rendering and display. Therefore, when the following description refers to functions that entities can execute during interaction with a drawing figure that is described as a wireframe, all such functions are programmed as part of the executable instructions of secondary marketplace 20 or another computer according to the context. All such functions are computer-implemented functions.

In an embodiment, the server computer 120 uses dynamic HTML to generate an event page 202 having a toolbar 204 and page body 210. In an embodiment, toolbar 204 comprises a search widget 206 that is programmed to receive a search query, transmit the query to database 124, receive a result set of records representing matching events, and generate the page body 210 based on HTML templates, style sheets, or hard-coded instructions for formatting. A query in search widget 206 may specify an event, event type, artist, genre, or other value that is indexed in the database 124.

Toolbar 204 may comprise links 208 to access other functions of server computer 120, such as descriptive information or account information for a user account of a user who is accessing the page 202.

In an embodiment, page body 210 comprises a START A GROUP button 212 and a STANDARD CHECKOUT button 214. Assume that fan 12 uses an input device coupled to client computer 102 to select the START A GROUP button 212. In response, server computer 120 is programmed to dynamically generate and return a CREATE A GROUP page to browser 104. In an embodiment, server computer 120 is programmed to create and store, in a group control table of database 124, a new group record to digitally represent the group. Each group record may comprise a plurality of control attributes in column values, in some embodiments including but not limited to: unique group identifier; group name; group description; minimum group size; a linked list of account identifiers of members of the group; and values for other group attributes as described in other sections herein.

In one embodiment, each group record also includes a status flag indicating a COMMIT status of TRUE or FALSE, or other equivalent Boolean values. Initially, upon creation, the status flag is set to FALSE to indicate that a group is not committed. The effect of a FALSE setting is to block the initiation of payment transactions for all accounts that are associated with a group. In other embodiments, a status flag is not required, and server computer 120 may be programmed to maintain a counter value of the number of recorded authorizations against the minimum size of the group. The effect of a counter value that is less than the minimum size of the group is to block the initiation of payment transactions for all accounts that are associated with a group.

FIG. 2B illustrates an example wireframe of a Create a Group Page.

In an embodiment on the CREATE A GROUP page a fan 12 may use an input device coupled to client computer 102 to select the EDIT NAME field 216 and update the default character string from "{Performer Name} Group" to any desired character string.

A fan 12 may select the EDIT DESCRIPTION field 218 and update the default (empty) character string to any desired character string.

A fan 12 may select the MINIMUM GROUP SIZE 220. In an embodiment, options for a minimum size of 1, 2, 3, or 4 group members is shown. In an embodiment, the minimum group size is the number of tickets that must be committed to by the Host or invitees of the Host (each, a "Guest") before those who have committed are subject to payment processing or card charges and receive their tickets. Other embodiments may use minimum group size values other than 1, 2, 3, or 4, based upon tradeoffs such as price volatility, conversion time goals or technical considerations. For example, the minimum group size could be 10, 12, or 20.

A fan 12 may select the NUMBER OF TICKETS NOW 222. In an embodiment, options for the fan 12 to purchase or authorize purchase for 1, 2, 3, or 4 tickets is shown. In an embodiment, the NUMBER OF TICKETS NOW also could be "0," for example, when one user is planning a group event for a group of others. Examples include executive assistants, administrative assistants, parents planning for children, and so forth.

In an embodiment, a fan 12 may then select the CONTINUE button 224 in order to proceed to the PAYMENT AND DELIVERY page. In an embodiment, in response to selecting the CONTINUE button 224, server computer 120 is programmed to cause storing, in the group record, the values that have been entered in the UI for name, description, minimum group size, and number of tickets now. If the fan 12 has selected a MINIMUM GROUP SIZE 222 that is larger than the NUMBER OF TICKETS NOW 224, then server computer 120 is programmed to transfer control to a PAYMENT AND DELIVERY—AUTHORIZE AND CREATE GROUP page. Note that only authorization for a purchase, and not an actual purchase, occurs with this option; the status flag retains a value of FALSE and the server computer 120 is programmed not to initiate a purchase transaction. If the fan 12 has selected a MINIMUM GROUP SIZE 222 that is equal to or less than the NUMBER OF TICKETS NOW 224, then the fan 12 will proceed to a PAYMENT AND DELIVERY—PURCHASE AND CREATE GROUP page. In this case, the server computer 120 is programmed to update the status flag to TRUE and a ticket purchase transaction can occur or commit.

Thus, in an embodiment, the secondary marketplace 20 is programmed with code by which a server computer controls commitment of database transactions, and therefore the purchase and conveyance of tickets or other items, under specified conditions. Functionally, if the Host commits to a number of tickets that is equal to or greater than the minimum group size, then the Host is charged or subject to payment processing immediately, receives the ticket(s), and may invite additional Guests from the group page. Guests may join by purchasing 1 or 2 tickets. In response, as data for the Guest is automatically added, the group membership may be automatically enlarged. If the Host commits to a number of tickets that is less than the minimum group size, then the Host's payment method is authorized for purchase of the ticket(s), but the authorized card charge or other payment method is not yet captured, and no order is placed with the API. In this case, the server computer and the use of a commit control column in the database function to block commitment or completion of database transactions and therefore the purchase and conveyance of tickets. However, the Host may invite additional Guests from the group page.

Guests may join by committing to one, two or more tickets by authorizing their payment method for purchase of the ticket(s). Embodiments that are programmed with a limit of two tickets may help find the cheapest tickets available using the API calls and result in more efficient processing with fewer calls, network messages, and consumption of network bandwidth. These embodiments may also increase the number of users who register in the system and commit to a transaction, resulting in the collection of profile data for more user accounts. The commit column in the database continues to block commitment or completion of transactions as long as the minimum group size is not met. Only when the minimum group size is reached, the system captures the authorized charges or other payment methods of the Host and each committed Guest. In an embodiment, the server computer is programmed to search for and execute transactions for the lowest-cost suitable tickets that are currently available, via API calls, to fulfill open orders of guest computers or accounts of the group.

After the minimum size is reached, in an embodiment, additional Guests can join by purchasing one or two tickets. In other embodiments, additional Guests can join by purchasing one ticket, or more than two. Because the commit control column, flag, or value has been cleared, orders of these guest computers or accounts are placed via API calls immediately. In an embodiment, the minimum group size must be reached before a timer expires. In various embodiments, the timer may be programmed to time 24, 48, or 72 hours, or any other period. Typically, the programmed timer period is within the maximum time allowed by card payment networks to convert an authorization to a charge or payment. If the minimum group size is not reached before time expires, which may be determined programmatically by testing whether the commit control column has been cleared when the programmed timer expires, then in response, the server computer marks the group as expired. The authorized charges or other payment methods are never captured, and no orders are placed with the API. FIG. 2C illustrates an example wireframe of a Payment and Delivery—Authorize and Create Group Page.

Furthermore, in an embodiment, there is no maximum group size; as long as tickets are available in inventory, the size of a group can increase as new Guests join and invite others.

In an embodiment, on the PAYMENT AND DELIVERY—AUTHORIZE AND CREATE GROUP page a fan 12 may use an input device coupled to client computer 102 to provide payment information in the PAYMENT SECTION 226.

In an embodiment, a fan 12 may select the desired delivery method in the DELIVERY section 228.

In an embodiment, a fan 12 may select the AUTHORIZE AND CREATE GROUP button in order to authorize payment for purchase of the ticket(s) and create the group.

FIG. 2D illustrates an example wireframe of a Payment and Delivery—Purchase and Create Group Page.

In an embodiment on the PAYMENT AND DELIVERY—PURCHASE AND CREATE GROUP page a fan 12 may follow the same steps as on the PAYMENT AND DELIVERY—AUTHORIZE AND CREATE GROUP page, but the last step is to select the PURCHASE AND CREATE GROUP button in order to purchase the ticket(s) and create the group.

Figure 3A:
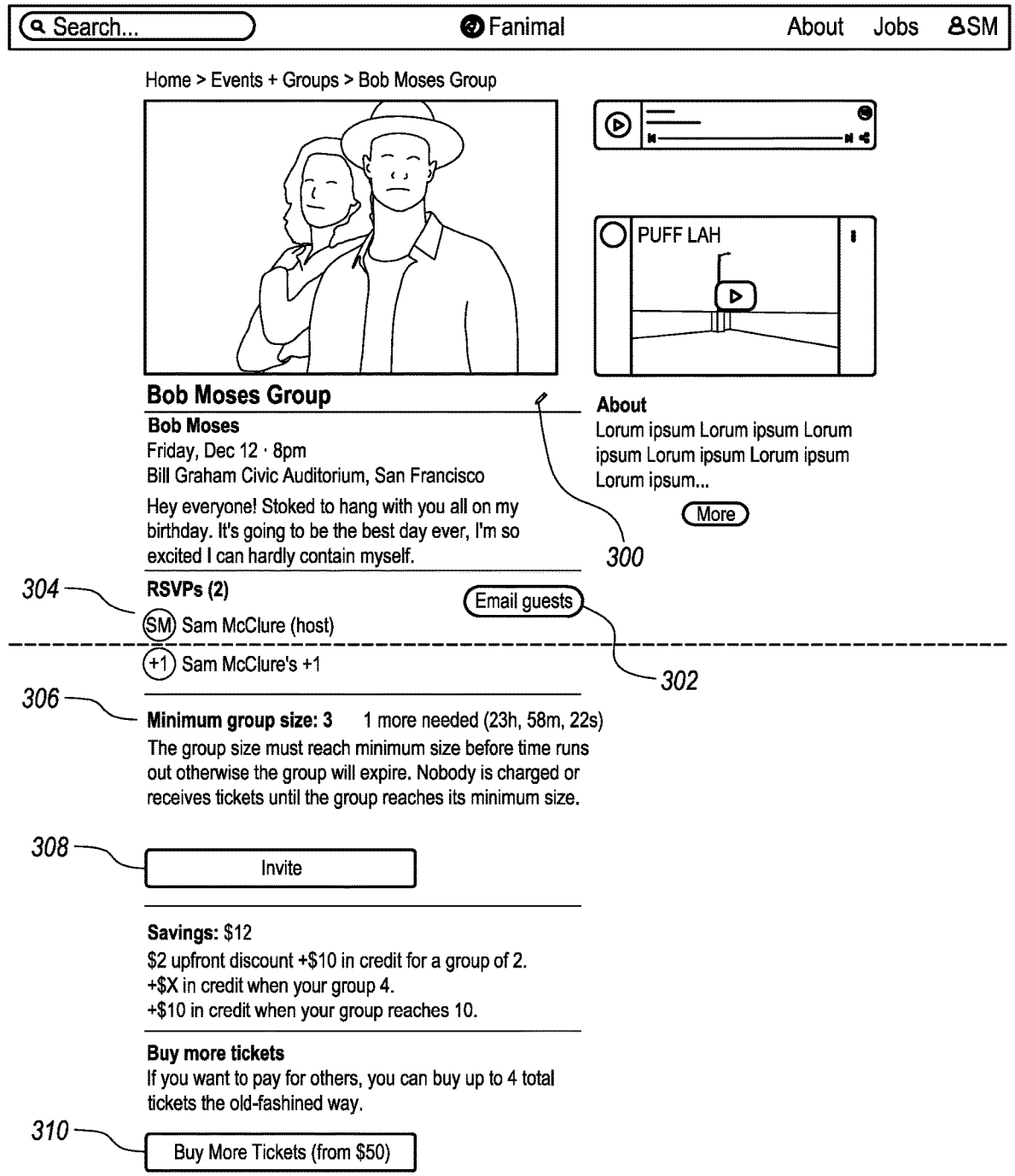
FIG. 3A illustrates an example wireframe of a Host Group Page—Minimum Size Not Reached.

FIG. 3A illustrates an example wireframe of a Host Group Page—Minimum Size Not Reached.

In an embodiment, the fan 12 who starts the group (the "Host") may edit the group name or description by selecting the EDIT button 300.

In an embodiment, the Host may email all group members by selecting the EMAIL GUESTS button 302. In other embodiments, server computer 120 may be programmed to support other forms of group messaging including message management within web pages that display group data, in-app messaging, SMS text messaging, or instant messenger platforms. The particular mechanism of messaging group members is not critical and different embodiments may use different forms of messaging.

In an embodiment, the group members are listed in the RSVP section 304.

In an embodiment, the remaining time for the group to reach minimum size before it automatically expires is displayed in the MINIMUM GROUP SIZE AND TIMER section 306.

In an embodiment, the Host can invite additional fans 12 by selecting the INVITE button 308. The unique group invite link is copied to the clipboard and may be shared via any communication channel, such as email.

In an embodiment, the Host can purchase additional tickets by selecting the BUY MORE TICKETS button 310. These additional tickets may cause the group to reach its minimum size.

Figure 3B:
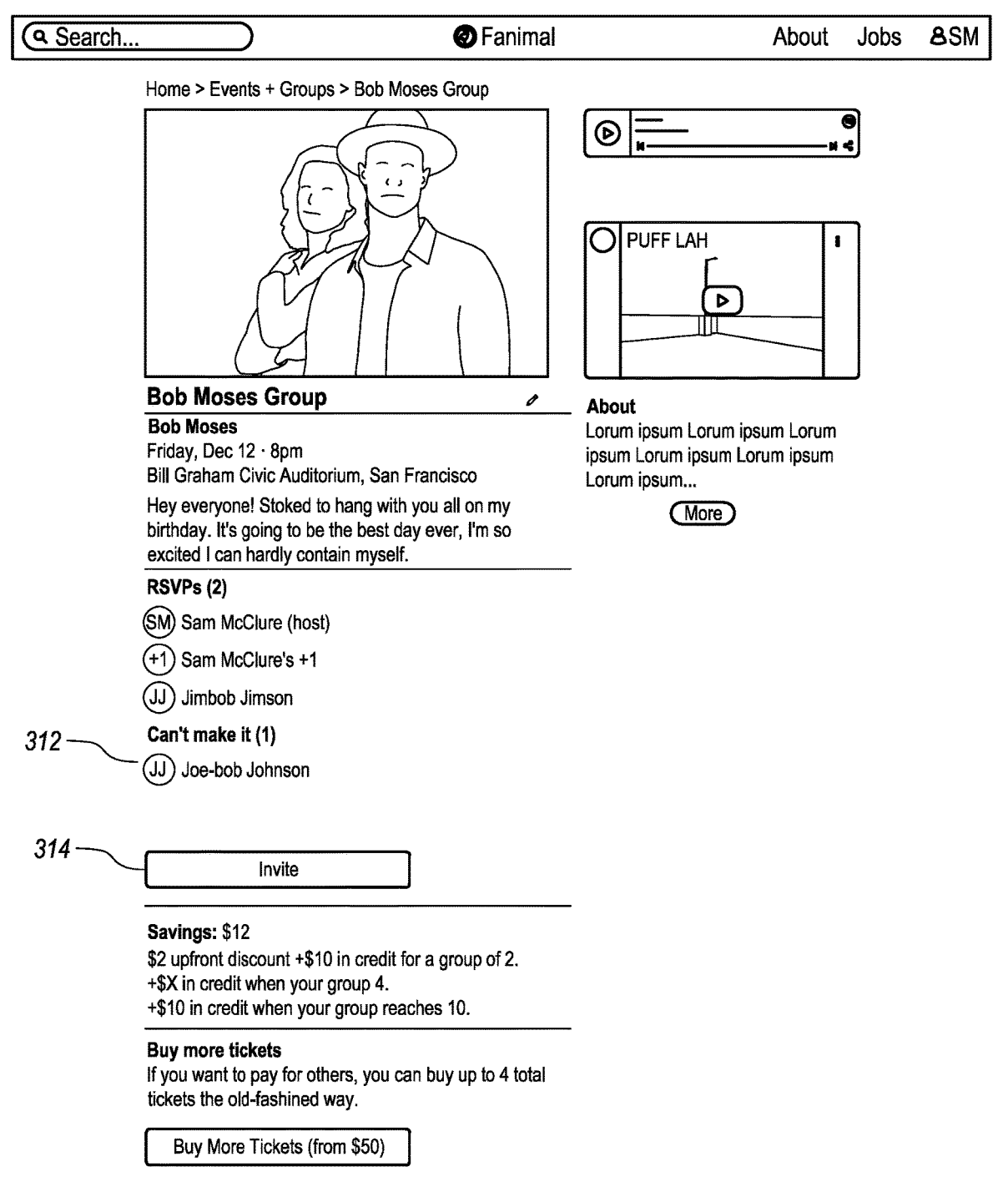

FIG. 3B illustrates an example wireframe of a Host Group Page—Minimum Size Reached.

In an embodiment, the HOST GROUP PAGE—MINIMUM SIZE REACHED page is identical to the HOST GROUP PAGE—MINIMUM SIZE NOT REACHED page except there is no MINIMUM GROUP SIZE AND TIMER section 306.

In an embodiment, invitees who are unable to attend may RSVP "Can't make it," and their response is listed in the RSVP NO section 312.

FIG. 3C illustrates an example wireframe of a Guest Group Page—Not Joined—Minimum Size Not Reached.

In an embodiment, an invitee (a "Guest") can join a group by selecting the JOIN GROUP button 316.

FIG. 3D illustrates an example wireframe of a Guest Group Page—Joined—Minimum Size Not Reached.

In an embodiment, a Guest who has joined a group can invite other Guests by selecting the INVITE button 318.

In an embodiment, a Guest who has joined a group can purchase additional tickets by selecting the BUY MORE TICKETS button 320. These additional tickets may cause the group to reach its minimum size.

FIG. 3E illustrates an example wireframe of a Guest Group Page—Joined—Minimum Size Reached. FIG. 3E illustrates example output of the group page for a Guest when the group minimum size has been reached; the "min size and timer" section is omitted.

FIG. 4 illustrates programmed functional elements and data flows for an example of a programmatic process for receiving and authorizing payments and securing tickets from suppliers. For purposes of illustrating a clear example of FIG. 4, assume that a Host wants a group with a minimum size of 2, authorizing for 1 ticket up front, with a ticket price $100. However, the same general programmatic flow may be used for other group minimum size values, other up-front authorization values, and other ticket prices. A Host 402 and Guest 404 may use client computing devices to establish network connections to a web server 406. For purposes of a clear example, in the priority application, the label "Fanimal Website (Fanimal.com)" appears in FIG. 4, but other embodiments may use other web servers with other labels or names in connection with other secondary marketplaces 20.

Web server 406 is communicatively coupled via one or more network links to a Payment Processor 412 and a group transaction application server 408. Again, to illustrate a clear example, in the priority application the label "Fanimal Server" is used in FIG. 4, but other embodiments may use other labels or names for an application server.

The application server 408 is communicatively coupled via one or more network links to a group record database 410, the Payment Processor 412, and application programming interfaces (APIs) 414. To illustrate a clear example, in the priority application, the label "Fanimal Database" is used in FIG. 4, but other embodiments may use any label for a database, database server, or other data repository.

In an embodiment, APIs 414 are communicatively coupled via one or more network links to Broker Networks 416, which are communicatively coupled in turn to Brokers 418. Each functional element illustrated in FIG. 4 may be implemented using one or more computing devices and/or storage devices that are programmed to execute the following functions or algorithmic steps.

3.1 The Host, while creating a group, provides the following information to the secondary marketplace 20 by entering digital data in an online form: Host Credit Card Info, as well as delivery information for purposes of fulfillment; Price of ticket on secondary marketplace 20 (for example, $100); minimum size (for example, 2); number of tickets (for example, 1).

3.2 The secondary marketplace 20 sends the Host Credit Card Info to a Payment Processor.

3.3 The Payment Processor sends Host Secure Payment Token to the secondary marketplace 20.

3.4 The marketplace server 408 sends the following information to an affiliated server computer: Host Secure Payment Token; Event ID; Price of ticket (for example, $100); minimum size (for example, 2); number of tickets (1).

3.5 The marketplace server 408 sends the following information to Payment Processor: Host Secure Payment Token; Price of ticket ($for example, 100). Payment Processor sends Host Charge ID to the marketplace server 408 in the case of a card charge. For payment methods other than card charges, other payment identifiers may be used.

3.5 The marketplace server 408 generates a Group ID 3.6 The marketplace server 408 sends information to Database of secondary marketplace: Group ID, Host Charge ID, Price of ticket (for example, $100), minimum size (for example, 2), number of tickets (for example, 1).

3.7 The Guest, while joining the group, provides the following information to the secondary marketplace 20: Group ID, Guest Credit Card Info, price of ticket (for example, $100), number of tickets (for example, 1).

3.8 The secondary marketplace 20 sends Guest Credit Card Info to Payment Processor.

3.9 The Payment Processor sends Guest Secure Payment Token to the secondary marketplace 20.

3.10 The secondary marketplace 20 sends the following information to the marketplace server 408: Guest Secure Payment Token, Group ID, number of tickets (for example, 1).

3.11 The marketplace server 408 sends the following information to Payment Processor: Guest Secure Payment Token, Price of ticket (for example, $100).

3.12 The Payment Processor sends a Guest Charge ID to the marketplace server 408.

3.13 The marketplace server 408 sends the following information to the Database: Group ID, Guest Charge ID, Price of ticket (for example, $100), number of tickets (for example, 1).

3.14 The marketplace server 408 determines that the minimum size (for example, 2) has been reached. In response, and not earlier, marketplace server 408 transmits the Host & Guest Charge IDs to the Payment Processor and commands it to capture them. Transmission of the Host and Guest Charge IDs may occur in a single message, or multiple messages that are dispatched at almost exactly the same time, typically within milliseconds. Unlike past approaches, the Charge IDs are transmitted in response to the minimum size being reached, even though corresponding authorizations had been received asynchronously at different times.

3.15 Payment Processor captures the charges or payments (for example, $100) and deducts a processing fee, typically in the range of 3%, although any fee can be used in different embodiments. The Payment Processor also adds the balance, for example, $97×2, to the secondary marketplace 20 payables with payment processing account.

3.16 The marketplace server 408 purchases the cheapest available tickets (pair, or two singles) via the integrated API Networks' ticket catalogues. For example, the cheapest two available tickets would be purchased as a pair or two singles. Assume, for example, that the purchase cost is $80 each.

3.17 The API Networks deliver the tickets to the Host & Guest via the agreed-upon delivery method. Examples of delivery methods include mail, email, and mobile transfer.

3.18 The API Networks add, for this example, $80 plus a fee (for example, $5)×2 of receivables to the secondary marketplace's 20 API Network payment account. The API Networks also add, for this example, $80×2 of payables to the Seller Broker API network payment account.

Thus, for this example, a summary of the flow of funds that is facilitated programmatically by digital electronic messages in an embodiment is: Host & Guest each pay $100; Payment processor nets $3×2; The secondary marketplace 20 nets $12×2; API Networks nets $5×2; Seller(s) net(s) $80×2.

Figure 7:
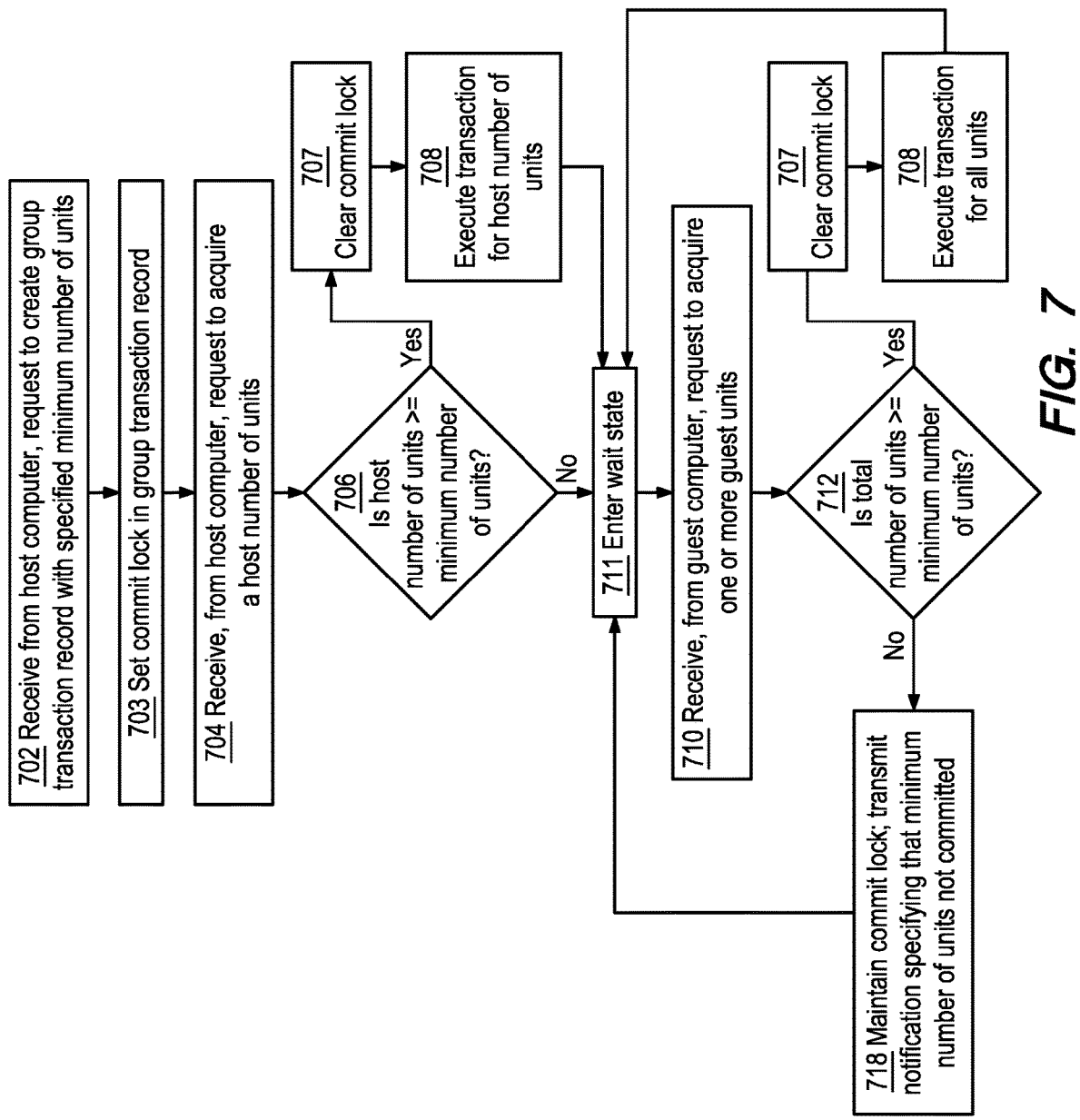
FIG. 7 illustrates a computer-implemented method of controlling commitment of group transactions.

FIG. 7 illustrates a computer-implemented method of controlling commitment of group transactions.

In operation 702, the process is programmed to receive, from a host computer, a request to create a group transaction record with a specified minimum number of units. "Host computer," in this context, may refer to a client computer 102 (FIG. 1), or a host computer as shown in FIG. 4, FIG. 6, which is associated with an account or user who will act as an initiator or host of a group transaction. In an embodiment, operation 702 triggers a database, under program control, to create and store a database record to represent the specified group. With operation 703, the process is programmed to set a commit lock in the group transaction record that represents the group. The commit lock may be a column attribute in a row that represents the specified group.

In operation 704, the process is programmed to receive, from the host computer, a request to acquire a host number of units.

At operation 706, the process is programmed to test whether the host number of units in the request of operation 704 is greater than or equal to the specified minimum number of units. If the host number of units in the request of operation 704 is greater than or equal to the specified minimum number of units, then control transfers to operation 707, in which the process is programmed to clear the commit lock. At operation 708, in an embodiment, the process is programmed to execute a transaction for the host number of units. Alternatively, at operation 708, where a group has already formed and a new guest is joining, operation 708 may comprise executing a transaction for all units with outstanding commit locks.

If the host number of units in the request of operation 704 is less than the specified minimum number of units, then control transfers to operation 711, in which the process is programmed to enter a wait state. Asynchronously, at some point thereafter, at operation 710, the process is programmed to receive, from a guest account that is different than the host account, a request to acquire one or more guest units.

At operation 712, the process is programmed to test whether a total number of units is greater than or equal to the specified minimum number of units. In this context, the "total number of units" is a sum of the host number of units that was received at operation 704 and the guest number of units that was received at operation 710. If the test of operation 712 determines that the total number of units is greater than or equal to the specified minimum number of units, then control transfers to operation 714, in which the process is programmed to clear the commit lock. At operation 708, the process is programmed to execute a transaction for all units, namely the host number of units for the host computer, and the guest number of units for the guest computer.

If the test of operation 712 determines that the total number of units is less than the specified minimum number of units, then control transfers to operation 718, in which the process is programmed to maintain the commit lock, thus blocking completion of a transaction for either the host computer or guest computer. In some embodiments, operation 718 may include transmitting a notification specifying that the minimum number of units is not committed, and that the transaction cannot complete. From operation 718, control transfers to operation 711, at which point the wait state continues.

Using computers programmed according to the foregoing algorithm, the commitment of transactions in items to be acquired by groups of accounts or users may be controlled so that a transaction cannot commit unless a specified minimum number of accounts provides payment information and acceptance of the transaction. A first account can initiate a group transaction, yet not incur payment risk until after the specified minimum number of accounts have joined the transaction. The inventive approach can greatly reduce the unnecessary use of CPU cycles, storage, memory, network bandwidth and network messaging that otherwise would occur with methods that require emailing, texting, or otherwise contacting group members and/or conducting payment transactions and ticket transfers that fail to achieve a desired arrangement of group item acquisition, venue seating arrangements, or other details.

2.2 Tickets and Group Transactions Both Managed by Service Provider

FIG. 6 illustrates an embodiment in which the same set of distributed computing elements store, host, and manage both ticket codes and group transactions.

In the example of FIG. 6, a host computer 602 and guest computer 604 are communicatively coupled via one or more network links to a distributed computing system 630 comprising a web server 606, group transaction application server 608, group record database 610, and ticket code database 620. Group transaction application server 608 and/or web server 606 may be communicatively coupled to a payment processor 612. The group transaction application server 608 may execute instructions that implement a group management API 614, by which external computers may transmit, programmatically, requests or calls to invoke group transaction management functions such as creating a group and adding guest accounts to a group.

In this arrangement, web server 606 is programmed to execute presentation layer functions to mediate communications between host computer 602 and guest computer 604 on the one hand, and group transaction application server 608 on the other hand. For example, web server 606 is programmed to receive substantive data for web pages, and page rendering requests, from group transaction application server 608 and to generate dynamic HTML, or other markup code or output for rendering using browsers of host computer 602 and/or guest computer 604.

Group transaction application server 608 is programmed to execute the transaction commit control functions that are further described in other sections herein.

Group record database 610 is programmed to store, in one or more relational database tables, records of groups. Each group record may comprise a rowid or other unique identifier, group name, group description, host account identifier, minimum group size, list of accounts that comprise guest or group members, a link to an event description of an event for which tickets will be obtained, and other metadata specifying a group.

Ticket code database 620 is programmed to store digital data representing sellable items such as event tickets. Informally, ticket code database 620 is a repository of barcodes or other unique identifiers of tickets stored in association with such metadata as may be necessary to define or describe an event, venue, date, time, and other details of a ticketed event. In some embodiments, a server, processor, or other computing element of computer system 630, which may be group transaction application server 608, is programmed to generate barcodes or other unique identifiers of tickets to be sold. In other embodiments, barcodes or identifiers are received programmatically from venues such as theatres, arenas, and stadiums. In yet other embodiments, barcodes or identifiers are received from agents of venues who generate the barcodes or identifiers for the venues on their behalf.

In an embodiment, the functional elements of FIG. 6 may be implemented using one or more computing devices and/or storage devices that are programmed to execute the following functions or algorithmic steps.

6.1 Host computer 602 requests a group creation page. Web server 606 serves a group creation page to the host computer 602. Host computer 602 provides the following information to the web server 606 by entering digital data in an online form: Host Credit Card Info, as well as delivery information for purposes of fulfillment; Price of ticket as previously offered or advertised by computer system 630 based on codes in ticket code database 620 (for example, $100); minimum group size (for example, 2); number of tickets (for example, 1).

6.2 Host computer 602 posts or submits the form to the web server 606, which is programmed to extract the data values specified above and programmatically call a function of the group transaction application server 608 that has been programmed to process creation of a group. The group transaction application server 608 sends the Host Credit Card Info to the payment processor 612.

6.3 The Payment Processor 612 sends a Host Secure Payment Token to the group transaction application server 608.

6.4 The group transaction application server 608 generates a Group ID, creates a row or record in a group management table in group record database 610, and updates the row or record with: Group ID, Host Charge ID, Price of ticket (for example, $100), minimum size (for example, 2), number of tickets (for example, 1).

6.5 Guest computer 604 transmits a request to access a group joining page to web server 606, which serves the page to the guest computer 604. The guest computer 604 provides the following information in a digital form in the page: Group ID, Guest Credit Card Info, price of ticket (for example, $100), number of tickets (for example, 1). The guest computer 604 posts or transmits a response back to the web server 606, which extracts data from the response and calls a group joining function of group transaction application server 608.

6.6 The group transaction application server 608 sends Guest Credit Card Info to the payment processor 612.

6.7 The payment processor 612 sends a Guest Secure Payment Token to the group transaction application server 608. In response, the group transaction application server 608 is programmed to retrieve the Group ID and number of tickets (for example, 1) associated with the guest computer 604. The group transaction application server 608 then sends the following information to the payment processor 612: Guest Secure Payment Token, Price of ticket (for example, $100).

6.8 In response, the payment processor 612 sends a Guest Charge ID to the group transaction application server 608.

6.9 The group transaction application server 608 updates the database record for the relevant group with: Group ID, Guest Charge ID, Price of ticket (for example, $100), number of tickets (for example, 1).

6.10 The group transaction application server 608 determines that the minimum size (for example, 2) has been reached. In response, and not earlier, group transaction application server 608 transmits the Host & Guest Charge IDs to the payment processor 612 and commands it to capture them. Transmission of the Host and Guest Charge IDs may occur in a single message, or multiple messages that are dispatched at almost exactly the same time, typically within milliseconds. Unlike past approaches, the charge IDs are transmitted in response to the minimum size being reached, even though corresponding authorizations had been received asynchronously at different times.

6.11 The payment processor 612 captures the charges (for example, $100) and deducts a processing fee, typically in the range of 3%, although any fee can be used in different embodiments. The payment processor also adds the balance, for example, $97×2, to a payables account associated with group transaction application server 608, computer system 630, or an entity associated with them.

6.12 The group transaction application server 608 transmits a query to ticket code database 620 to select the cheapest available tickets (pair, or two singles) for the specified event. For example, the cheapest two available tickets would be purchased as a pair or two singles. Assume, for example, that the purchase cost is $80 each. The group transaction application server 608 delivers the tickets to the host computer 602 and guest computer 604 via an agreed-upon delivery method.

2.3 Tickets Managed by Secondary Markets; Group Transactions Managed by Independent Party Under License from Service Provider In an embodiment, group item acquisition may be implemented using a distributed computer system in which items such as tickets are offered in and managed by secondary markets, but group transactions are managed by an independent party, using software and/or systems that are used under a license from a service provider that owns and/or operates the software and/or systems.

In an embodiment, the distributed computer system of FIG. 1 is used. A first entity authors and owns the group transaction commit control instructions 122, and licenses the use of the instructions, or a copy of executable(s) that embody the instructions, to a second entity that owns and operates the server computer 120.

In some cases, the first entity may own and operate the server computer 120 and license access or use to the second entity. For example, server computer 120 may comprise a virtual computing instance executing the instructions 122 that the first entity instantiates and configures in a private datacenter or public datacenter, and grants access to the second entity under a license or other use agreement.

Data flows and algorithmic flows are the same as described above for FIG. 1, FIG. 2A, FIG. 2B, FIG. 2C, FIG. 2D, FIG. 3A, FIG. 3B, FIG. 3C, FIG. 3D, FIG. 3E, FIG. 4. Server computer 120 executes operations as described for the foregoing drawing views. Web pages that the server computer 120 delivers as part of the user interface examples of FIG. 2A, FIG. 2B, FIG. 2C, FIG. 2D, FIG. 3A, FIG. 3B, FIG. 3C, FIG. 3D, FIG. 3E may use branding or other identifying indicia that refers to the first entity. The second entity may interact with the first entity if a processing error occurs or if special reporting is needed concerning group transactions, but otherwise the second entity acts passively concerning interactions between the entities shown in FIG. 1, FIG. 4.

2.4 Tickets Managed by Independent Party and Group Transactions Managed by Same Independent Party Under License from Service Provider In an embodiment, group item acquisition may be implemented using a distributed computer system in which items such as tickets are offered in and managed by an entity, and group transactions are managed by the same entity using software and/or systems that are used under a license from a service provider that owns and/or operates the software and/or systems.

In this embodiment, the distributed computer system of FIG. 6 is used. A first entity authors and owns all executable instructions or other software elements of web server 606, group transaction application server 608, and group record database 610. The first entity licenses the use of these elements, or a copy of executable(s) that embody these elements, to a second entity. In one implementation, the second entity owns and operates a virtual computing instance or server computer that hosts the licensed elements in the form of the distributed computer system 630, and also owns and hosts the ticket code database 620 and tickets or other items served from the database. In another implementation, the first entity may own and operate a server computer or virtual machine instance acting as a hardware platform for the distributed computer system 630 and may license access or use to the second entity, which loads ticket code database 620 with barcodes or other digital data representing tickets or other items that the second entity owns for resale.

Data flows and algorithmic flows are the same as described above for FIG. 6. Web pages that the web server 606 delivers as part of a user interface may use branding or other identifying indicia that refers to the first entity. The second entity may interact with the first entity if a processing error occurs or if special reporting is needed concerning group transactions, but otherwise the second entity or the licensor of group transaction application server 608 and related elements acts passively concerning interactions between the entities shown in FIG. 4 and with respect to item acquisitions, group formation, group management and other operations.

3. Table of Functional Scenarios

In an embodiment, secondary marketplace 20 is programmed to implement a plurality of different functional scenarios, as summarized in the following table.

| Minimum size set by Host | Host commits to purchasing [X] tickets at checkout | Sufficient Guests join to reach minimum size before time expires? | Result |
| --- | --- | --- | --- |
| 1 | 1, 2, 3, 4 | N/A | Group formed immediately, Host charged, additional Guests pay as they join. |
| 2 | 1 | Yes | Host's authorization becomes a charge when Guest joins. Guest pays when joining. Additional Guests pay as they join. |
| 2 | 1 | No | Group expires |
| 2 | 2, 3, 4 | N/A | Group formed immediately, Host charged, additional guests pay as they join. |
| 3 | 1, 2 | Yes | Host's authorization becomes a charge when sufficient Guests join. Guests join by authorizing payment, until minimum size is reached, at which point the Guest joining will join by paying, and all outstanding authorizations become charges. Additional Guests pay as they join. |

-continued

| Minimum size set by Host | Host commits to purchasing [X] tickets at checkout | Sufficient Guests join to reach minimum size before time expires? | Result |
|---|---|---|---|
| 3 | 1, 2 | No | Group expires |
| 3 | 3, 4 | N/A | Group formed immediately, Host charged, additional guests pay as they join. |
| 4 | 1, 2, 3 | Yes | Host's authorization becomes a charge when sufficient Guests join. Guests join by authorizing payment, until minimum size is reached, at which point the Guest joining will join by paying, and all outstanding authorizations become charges. Additional Guests pay as they join. |
| 4 | 1, 2, 3 | No | Group expires |
| 4 | 4 | N/A | Group formed immediately, Host charged, additional guests pay as they join. |

4. Benefits of Certain Embodiments

Embodiments provide numerous technical benefits in comparison to prior technology. As one example, embodiments are programmed to enable customers to delay the commitment of a purchase until the minimum group size is reached, by using conditional purchase card authorizations in which they authorize their card pending the minimum size being reached. Prior systems do not provide the technical means to enforce conditional purchase card authorizations in which an authorization is given but a seller computer cannot convert the authorization to a payment unless a group of buyers of a specified minimum size also commits to a purchase with the group. Instead, all other prior services require immediate payment. Importantly, embodiments reduce or eliminate the large number of phone calls, text messages, or emails that group members otherwise would have to exchange to form a group, determine who is committed to an event, obtain purchase authorization, and complete a group transaction involving many individual purchases.

Furthermore, embodiments may be programmed to complete charge transaction messaging even when a plurality of individual authorizations are communicated at different times. For example, in a group of four where the Host only authorizes for one ticket, as many as four unique user accounts can purchase tickets simultaneously despite having completely different authorization times. The Host and the first two guests can authorize payment at different times, but nobody is charged until the fourth person joins. No other ticketing platforms allow for simultaneous purchasing by multiple users.

Although the actual purchasing of tickets is simultaneous and linked, the delivery of tickets is still separate and individual. Each purchaser separately receives their tickets.

The customers that authorize for the purchase of a ticket are not affected by price fluctuations. For example, if a Host authorizes tickets for $100, but when the authorization is converted to a charge, the cost of a ticket has changed to $120, the Host still only pays $100 to secure a ticket.

Embodiments may use any available payment methods or payment networks. Commercial examples include Stripe credit cards or debit cards, PayPal, Affirm, and so forth.

Embodiments also improve over past services by combining social networking services with ticket purchasing in a manner not technically offered before. Rather than merely conducting a ticket transaction for an event by computer, user accounts join a group that the secondary marketplace 20 manages. Server computer instructions of secondary marketplace 20 are programmed to present a group page with a response list, a custom group name, a description, and a guest list including committed guests and non-committed invitees. In one embodiment, those who decide not to join the group can log in to the secondary marketplace 20 anyway and give a negative response. Data for these guests is visible to committed guests in the group page.

In an embodiment, secondary marketplace 20 is programmed to enable a host to invite, to a new event, a list of guests who participated in a prior event. For example, if the host coordinated a group of ten to acquire tickets for and attend a past event, in an embodiment, the host may select the same group by name and invite the group to a new event without re-entering all names or individually generating invitations.

In an embodiment, guests join a group by using a computing device to select and programmatically follow links via text or email. Subsequent guests joining the group are not just purchasing tickets but purchasing tickets as part of a specific group of user accounts. As such, guests can see additional information not included in the purchase processes of other websites. For instance, guests can request and receive web pages showing the people who have already joined the group, and the number of people in the group. In an embodiment, secondary marketplace 20 is programmed to selectively display digital images of users associated with user accounts that have already joined a group, to guests with accounts that have just joined a group.

In an embodiment, secondary marketplace 20 is programmed to enable users to invite others to purchase tickets to the same event, and also join the specific purchasing group of accounts via text, email or any other messaging platform. Therefore, in an embodiment, secondary marketplace 20 is programmed to make social networking information available to a guest joining a group that the guest otherwise would not have.

In an embodiment, secondary marketplace 20 is programmed to receive, from group hosts, digital data representing additional details about the group experience in the group page. No other ticketing platform allows for this event description and customization within the same platform that allows for the purchasing of tickets. For instance, a group host can name the group, and add logistical details like "meet at my place before" or "meet at X bar afterward."

In an embodiment, secondary marketplace 20 is programmed to conduct group purchase transactions which contains methods of communicating with other members of the group within the same platform that allows for the purchasing of tickets. Hosts can edit the description of the event, and only members of the group can see the text associated with the group. No other platform combines communication and purchasing of tickets for external events in this way.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
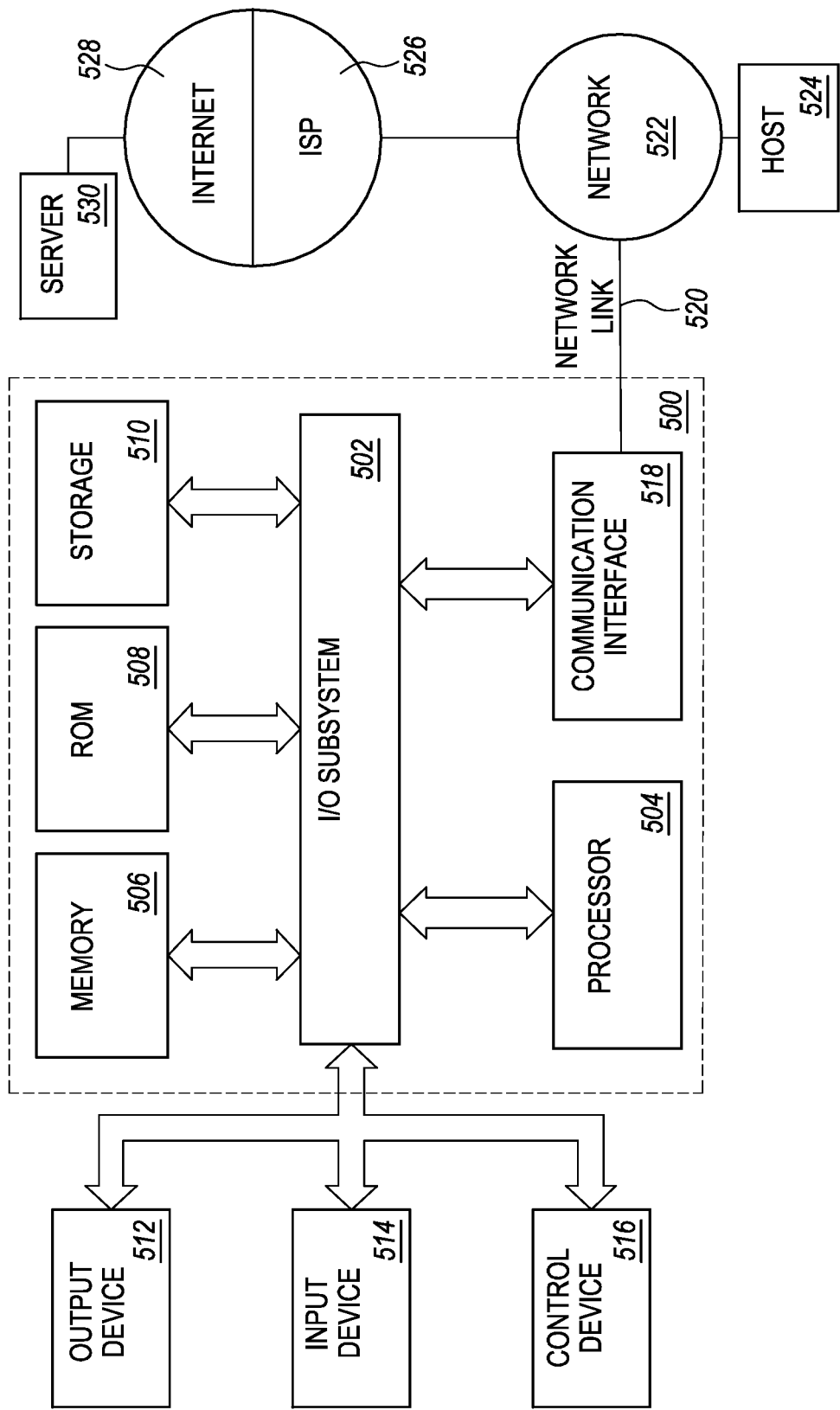
FIG. 5 illustrates an example computer system with which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of controlling commitment of transactions in tickets, the method comprising:
   receiving, from a host computer, a request to create a group transaction record, the request specifying a specified minimum number of units of the tickets, and storing the specified minimum number in the group transaction record in a group control table of a relational database, the group control table having a plurality of control attributes in column values;
   setting a commit lock in a column attribute of the group transaction record in the database;
   receiving, from the host computer, a request to acquire a host number of units of the tickets;
   determining whether the host number of units is greater than or equal to the specified minimum number of units;
   in response to determining in a first test operation that the host number of units is greater than or equal to the specified minimum number of units, clearing the commit lock and executing a first transaction of the host computer to acquire the host number of units of the items;

in response to determining in the same first test operation that the host number of units is not greater than or equal to the specified minimum number of units:

entering a wait state;

receiving, from a first guest computer, a request to acquire one or more first guest units of the tickets;

determining in a second test operation whether a sum of the host number of units and the first guest units is greater than or equal to the specified minimum number of units;

in response to determining in the same second test operation that the sum is greater than or equal to the specified minimum number of units, clearing the commit lock and executing a second transaction of the host computer to acquire the host number of units of the tickets and executing a third transaction of the first guest computer to acquire the one or more first guest units of the tickets;

in response to determining in the same second test operation that the sum is not greater than or equal to the specified minimum number of units, maintaining the commit lock and returning to the wait state.

2. The method of claim 1, further comprising, during the wait state:

receiving, from a second guest computer, a request to acquire one or more second guest units of the tickets;

determining in a second iteration of the second test operation whether a sum of the host number of units, the first guest units, and the second guest units is greater than or equal to the specified minimum number of units;

in response to determining in the same second iteration of the same second test operation that the sum is greater than or equal to the specified minimum number of units, clearing the commit lock and executing the second transaction of the host computer to acquire the host number of units of the tickets, the third transaction of the first guest computer to acquire the one or more first guest units of the tickets, and a fourth transaction of the second guest computer to acquire the one or more second guest units of the tickets;

in response to determining in the same second iteration of the same second test operation that the sum is not greater than or equal to the specified minimum number of units, maintaining the commit lock and returning to the wait state.

3. The method of claim 1, further comprising:

in response to determining that the sum of the host number of units and the first guest units is not greater than or equal to the specified minimum number of units:

transmitting a notification to the guest computer specifying that the sum of the host number of units and the first guest units is not greater than or equal to the specified minimum number of units;

maintaining the commit lock;

returning to the wait state.

4. The method of claim 1, further comprising:

receiving, from a second guest computer, a request to acquire one or more second guest units of the tickets;

determining that the commit lock is clear;

executing a fourth transaction of the second guest computer to acquire the one or more second guest units of the tickets.

5. The method of claim 1, the tickets comprising event tickets.

6. The method of claim 5, further comprising receiving the request via an application programming interface (API) call from a broker network.

7. The method of claim 6, further comprising receiving the request in association with a transaction of a fan computer or a broker computer to acquire the event tickets via a secondary marketplace of event tickets.

8. The method of claim 1, further comprising:

in response to receiving, from the host computer, the request to acquire a host number of units of the tickets, transmitting a host payment card authorization request but not a host payment card charge request to a payment processor;

transmitting the host payment card charge request to the payment processor only in response to determining that the host number of units is greater than or equal to the specified minimum number of units.

9. The method of claim 1, further comprising:

in response to receiving, from the host computer, the request to acquire a host number of units of the tickets, transmitting a host payment card authorization request but not a host payment card charge request to a payment processor;

in response to receiving, from the first guest computer, the request to acquire one or more first guest units of the tickets, transmitting a guest payment card authorization request but not a guest payment card charge request to the payment processor;

transmitting both the host payment card charge request and the guest payment card charge request to the payment processor only in response to determining that the sum of the host number of units and the first guest units is greater than or equal to the specified minimum number of units.

10. The method of claim 1, further comprising:

transmitting to a secondary marketplace computer, in response to the request of the host computer or the request of the guest computer, an item inventory query identifying one or more of the host number of units and the first guest units;

receiving, from the secondary marketplace computer, a response message specifying that one or more of the host number of units and the first guest units is available in inventory.

* * * * *